United States Patent

[11] 3,591,232

| [72] | Inventor | Lewis B. Simon |
| | | 1801 Joanne Way, Oxnard, Calif. 93030 |
| [21] | Appl. No. | 812,472 |
| [22] | Filed | Apr. 1, 1969 |
| [45] | Patented | July 6, 1971 |

[54] AUTOMATIC VEHICLE OCCUPANT RESTRAINT
9 Claims, 5 Drawing Figs.

[52] U.S. Cl. .................................................. 297/216,
280/150, 296/65, 297/384
[51] Int. Cl. ............................................. B60r 21/10
[50] Field of Search ........................................... 280/150,
150 B; 180/82; 297/216, 384; 296/65, 65.1

[56] References Cited
UNITED STATES PATENTS
| 2,335,340 | 11/1943 | Koppelman ................. | 297/216 (X) |
| 2,660,222 | 11/1953 | Woodsworth .............. | 280/150 (B) (X) |
| 2,796,112 | 6/1957 | Barsky ........................ | 297/216 |
| 2,823,730 | 2/1958 | Lawrence .................... | 297/216 |
| 2,916,081 | 12/1959 | Pinkel ......................... | 297/216 |
| 2,922,461 | 1/1960 | Braun ......................... | 297/216 |
| 2,943,866 | 7/1960 | Witter ......................... | 280/150 (B) |
| 3,452,834 | 7/1969 | Gaut ............................ | 180/82 |

*Primary Examiner*—Benjamin Hersh
*Assistant Examiner*—Leslie J. Paperner

ABSTRACT: An occupant-restraining member embodied into a vehicle seat constructed so as to automatically enfold and restrain the occupant in the event of a sudden vehicle deceleration. In operation the restraining member is abruptly raised so as to contact the underside of the occupant's upper legs and fold the occupant's upper legs and body between it and the seat back.

INVENTOR.
Lewis B. Simon

3,591,232

AUTOMATIC VEHICLE OCCUPANT RESTRAINT

BACKGROUND OF THE INVENTION

1. Field of the Invention

The invention pertains to safety devices for moving vehicles and particularly to devices which are actuated upon occurrence of an emergency condition to restrain the vehicle occupant so as to protect him from violent impact with the vehicle interior or separation from the vehicle.

It is applicable to all moving vehicles including automobiles, buses, trucks, tanks, aircraft and boats and the principles of operation will readily be apparent to be applicable to any vehicle operation wherein sudden deceleration forces may occur including deceleration forces encountered by space vehicles during reentry.

2. Description of the Prior Art

Heretofore numerous harness means have been proposed to restrain vehicle occupants while said occupants were subjected to abrupt deceleration and ejection forces. Such restraints have numerous well-known deficiencies and, though they retain the occupant within the vehicle, they are also capable of causing injury. Furthermore, their use is frequently uncomfortable and requires the irksome action of preliminary attachment at the start of every trip and critical adjustment before they are effective. Finally there is a tendency of most possessors of such harnesses to ignore their presence and to fail to put them to use.

A movable seat structure has also been proposed wherein the entire seat swings as an assembly in an arcuate path in order to lift the seat bottom upwardly into the normal path into which the occupant's body is thrown. Such constructions have proven to be objectional in that a great excess of space is required within the vehicle and furthermore these constructions are ineffective since no restraint is afforded the upper portion of the occupant's body.

SUMMARY OF THE INVENTION

The present invention comprises a seat and operable occupant restraining member which may form the U-shaped periphery of the sides and front of the seat bottom portion which member is so mounted that its forward edge or crossbar is abruptly raised when excessive deceleration occurs, this raising action serving to lift the articulated leg of the occupant at the knee joint and interpose itself into the line of normal momentum while at the same time folding and restraining the vehicle's occupant between said restraint member and the vehicle seat back. It is actuated by a quick-acting deceleration sensing means which quickly unlatches the restraint member raising mechanism to effect the aforesaid raising function.

Other objects, advantages and novel features of the invention will become apparent from the following detailed description of the invention when considered in connection with the accompanying drawings.

DESCRIPTION OF THE PREFERRED EMBODIMENT

Figure 1:
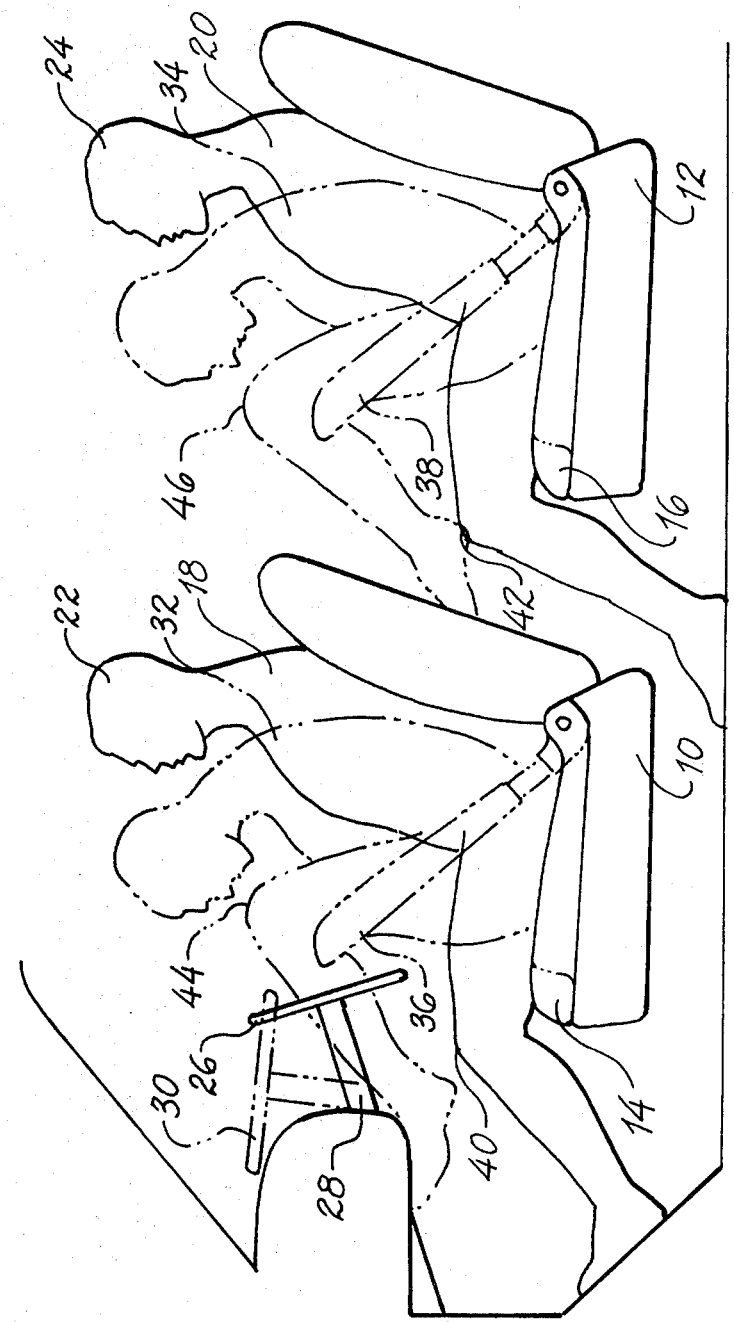
FIG. 1 is a diagrammatic change position side view showing the restraint member of the present invention in normal relationship in solid lines and in fully actuated position in dot-dash lines.

Referring now to the drawings in detail there is shown in FIG. 1 a seat arrangement comprising front and rear seats 10 and 12 which have corresponding occupant-restraining member portions 14 and 16. The front seat has a vehicle operator depicted in solid lines 18 while the rear seat has a similar occupant depicted in solid lines 20. Each has an upright head portion 22 and 24 respectively.

In front of the vehicle operator 18 is a control device such as the conventional steering wheel 26 which is preferably hinged or otherwise actuated at point 28 so as to be movable to an out-of-the-way position shown in dotted lines as 30.

In referring to the present invention there is provided suitable means whereby the front and rear vehicle occupants 18 and 20 may be moved into their dotted line positions 32 and 34 upon sudden deceleration of the vehicle as, for example, when it strikes an object. When this occurs the occupant-restraining members 14 and 16 are rapidly moved into the changed positions illustrated by dotted lines 36 and 38, simultaneously lifting the knee portions 40 and 42 of these occupants to the changed positions shown in dotted lines 44 and 46 respectively. The vehicle control or steering wheel structure 26 is so constructed that any interference by said structure with the motion of a seat part will cause it to fold at point 28 to the dotted line change position 30.

Figure 2:
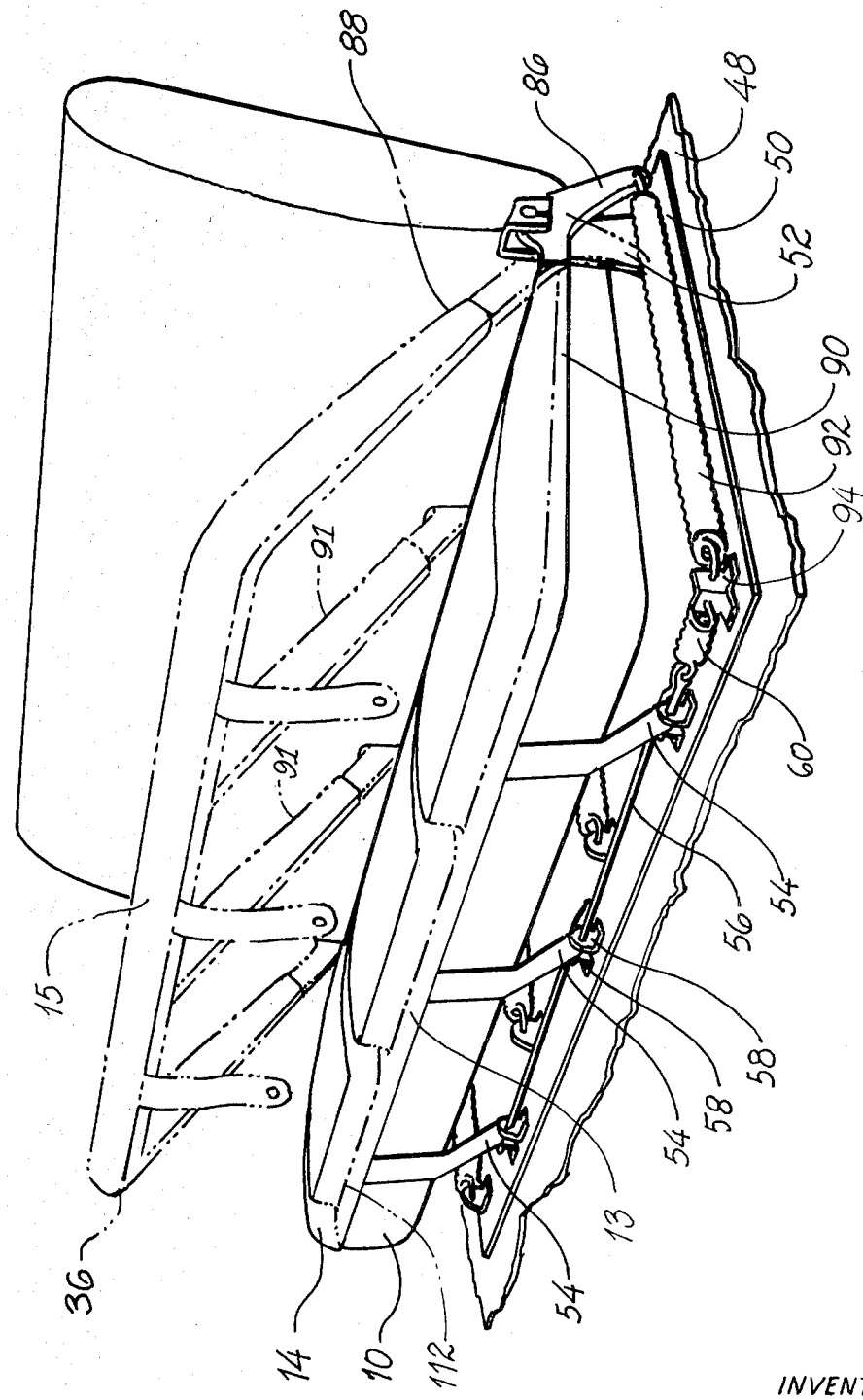
FIG. 2 is a change position perspective view of the restraint member and seat of FIG. 1 showing the details of the mechanism which raises the restraining member from the seat upon sudden deceleration of the vehicle.

Now referring to FIG. 2 there is illustrated a seat-actuating mechanism together with a portion of an inertia sensing tripping device and associated linkage which will effect the aforesaid sudden change in the orientation of the occupant-restraining member. In this drawing, the vehicle floor 48 is shown provided with a seat mounting platform 50 upon which a seat 10 incorporating an occupant-restraining member 14 may be supported. It will be apparent that although only the front vehicle seat is hereafter shown and described, a corresponding construction is applicable to the rear passenger seat and to any other seats in a multiseated vehicle.

Though in FIG. 2 only the mechanism at the left end of the seat is illustrated it will be apparent that another inertia sensing and occupant-restraining member actuating mechanism may be employed at the opposite or right end of the seat. Furthermore it will be apparent that such inertia-sensing mechanisms may be linked together by cables, rods or the like or electrically or hydraulically so that they operate in unison and so that the restraining member is abruptly released from all latching points simultaneously.

As shown in FIG. 2, upstanding aft stanchion 52 pivotally receives a portion of the restraining-member mechanism. Furthermore it will be apparent that the forward edge of the restraining member incorporates holddown straps 54 secured by a trip rod 56. The trip rod 56 passing through holes in the straps 54 and holes in the clips 58 holds member 14 from changing position.

Also shown in FIG. 2 is the change position 36 of the member 14, and the dotted lines 112 which show the contours of the seat recess which receives the restraining member 14 when it is in its normal position, the restraining-member crosspiece 13 and change positions 15 of the crosspiece and 91 of the intermediate arms.

Figure 3:
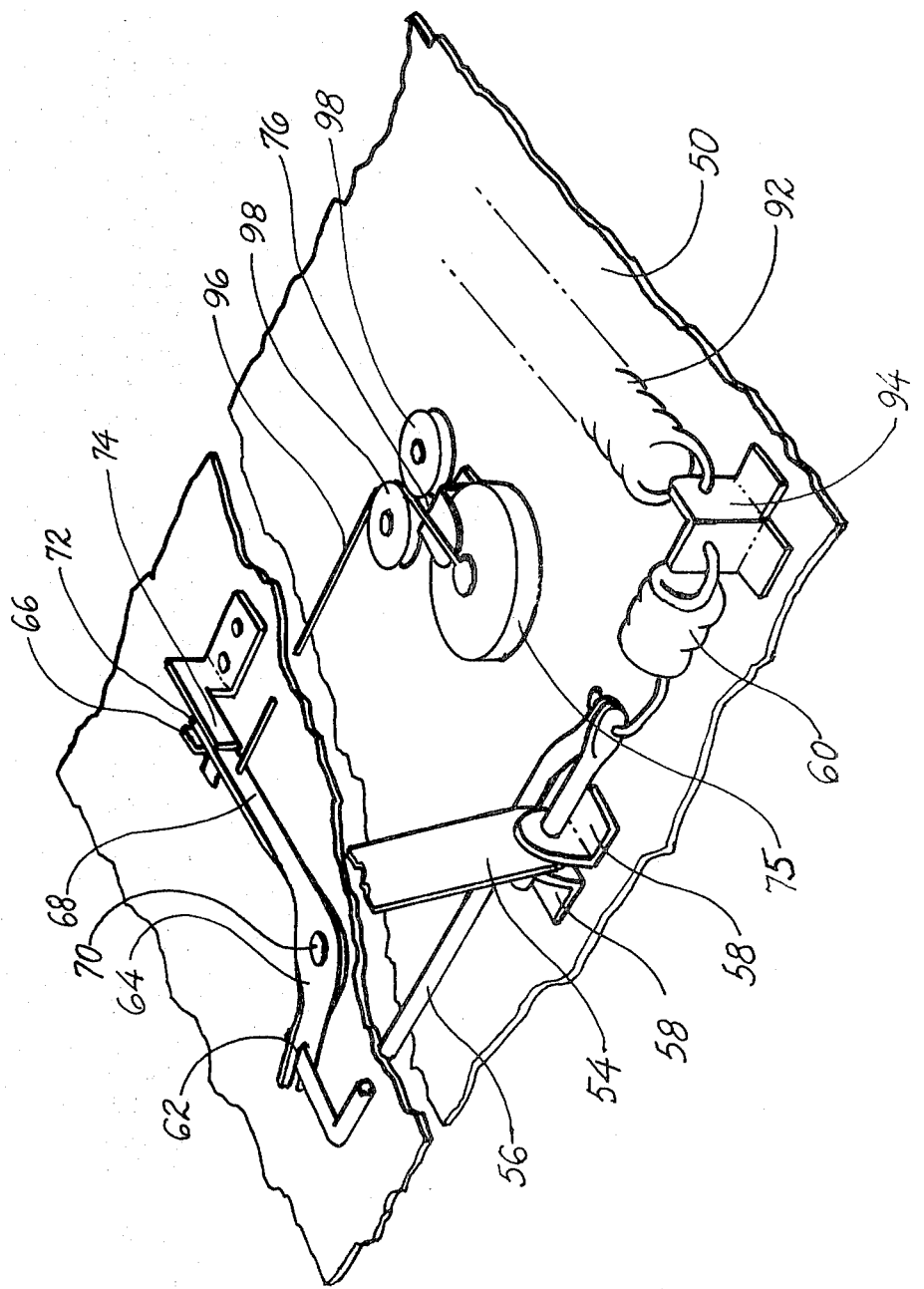
FIG. 3 is an enlarged, detailed perspective view of a deceleration-sensing means in the cocked or ready position.

Examining for a moment FIG. 3 it will be observed that the outer end of trip rod 56 is normally restrained against axial movement urged by extended trip spring 60 by the fork 62 of the bellcrank 64 which is journaled at point 70 and has an arm 68 with a tip 72 restrained by a yieldable detent 74 and a positioning ledge 66. As long as the arm 68 is kept in the position illustrated in FIG. 3 the trip rod 56 and the member 14 are kept securely locked in the lowered position.

An inertia sensitive member which, if desired, may be in the form of a movable block 75, may be supported in the manner shown in FIG. 3 and prevented from moving rearwardly by ledge 76. The detent 74 overlies the tip 72 and normally restrains said tip 72 from arcuate sideward movement which would have the effect of bending the detent 74 to free the tip 72 permitting the release arm 68 to rotate about journal point 70. This causes the trip rod restraining fork 62 to move out of the path of trip rod 56 allowing rod 56 to be urged axially by spring 60 thereby releasing the holddown straps 54 which resist motion of the occupant-restraining member 14.

From FIG. 3 it will also be observed that the inertia sensitive movable block 75 is normally restrained against movement by a resilient device such as the yieldable detent 74 which normally restrains the block 75 in the position shown, snugly pressing against a positioning ledge The detent 74 is so constructed that the force from the inertia sensitive block 75 must exceed a predetermined level corresponding to a predetermined deceleration level before detent 74 will yield sufficiently to unblock tip 72, permitting said tip move past detent 74 thereby permitting the release of the restraining member 14 as described in the paragraph next above. Though detent 74 is illustrated as a resilient or deformable member it will be apparent that a shear pin or any other sudden release mechanism may be employed and that movement of the block sidewards to the right or left, or forward will pull cable 90 through spaced sheaves 98 to urge tip 72 past detent 74. Though the inertia sensitve means is illustrated as a block, it will be apparent that many forms of state of the art accelerometers may be employed and some of these may operate the releasing means electrically or hydraulically.

Figure 4:
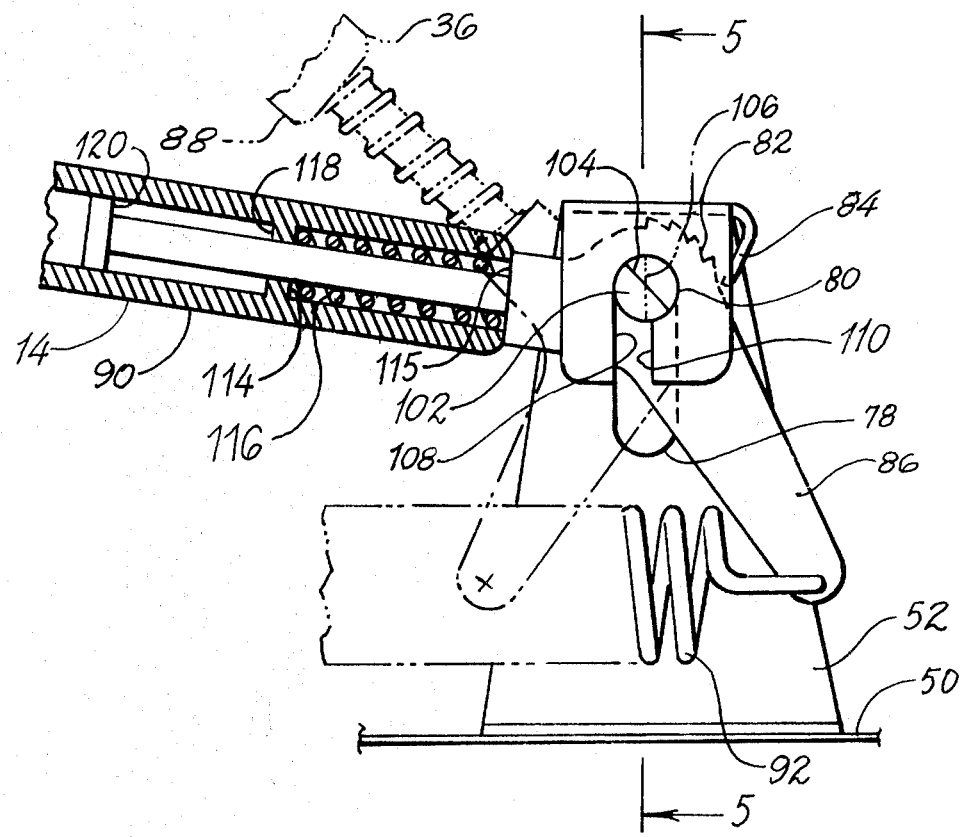
FIG. 4 is a detailed side view partially in section of the journaling the force applying, and position holding means of the restraining member.

From FIG. 4 it will be observed that the rear end of restraining member 14 is journaled in vertical slot 78 and cutout 80 in stanchion 52 and embodies ratchet teeth 82 which are engaged by pawl part 84 of aft stanchion 52, and embodies a bellcrank-operating arm 86. It is important that sufficient force be available to quickly raise the crosspiece 13 of the restraining member 14 upon vehicle impact intensity greater than a preselected value, and accordingly in the present invention there is shown one form of resilient restraining member erecting mechanism which in FIG. 2 may comprise the bellcrank leg operating arm 86 and a part of the restraining member side arm 90 journaled on stanchion 52. Said arm 86 pivots under urging from tensioned spring 92 the opposite end of which is anchored at clip 94. Though illustrated as a tension spring, it will be apparent that there may be substituted any force means including hydraulic, expanding gases, electrical, compression springs or other energy storing and transferring means.

FIG. 4 also illustrates the interior construction of arm 90 of member 14 which embodies a compressed spring 116, one pressing against the abutment surface 115 of the journaled portion of member 14 and the other and pressing against abutment 114 within member 14. When the member 14 is released it will be urged forward by spring 116 until the abutment surface 118 strikes the enlarged stop 120.

Figure 5:
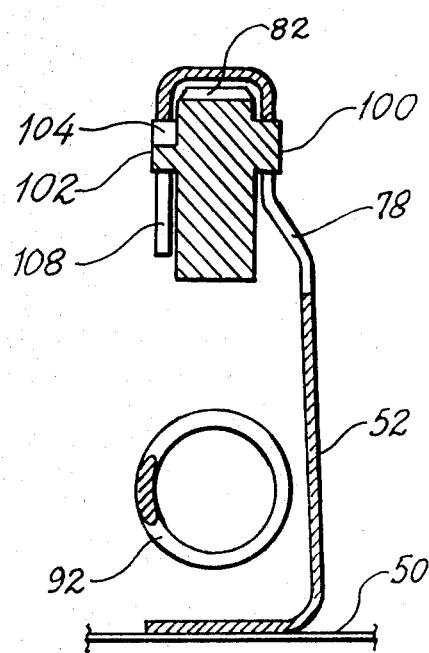
FIG. 5 is a vertical sectional view taken on a line substantially corresponding to line 5-5 of FIG. 4.

Further examination of FIGS. 4 and 5 will reveal that the arm 90 has an inboard stub axle 100 and an outboard partial axle 102. It will be observed that a portion of axle 102 has been removed at the plane 104. When arm 90 has been lifted to the dotted line position 88, the pawl 84 will engage one of the teeth 82 to block the occupant-restraining member 14 from returning to its normal position. Plane 104 will then have pivoted to a substantially vertical alignment 106 permitting the reduced width of partial axle 102 to drop downwardly between the edges 108 and 110 of the cutout 80.

In the preferred embodiment a weight employed as an inertia-sensing means releases an occupant-restraining member which is forced upwardly by a tension spring. However, it will be apparent that this result could be achieved by the use of an accelerometer which, when a predetermined level of deceleration is reached, actuates releasing means actuates springs, electrical energy, fluid pressure or compressed gases, or actuate gas generating means which through piston and linkage or other equivalent means would quickly raise the occupant-restraining member. It is also apparent that if desired a curtain could be fastened to the forward edge of the restraining member, the lower edge of such curtain being secured to the seat platform. When the restraining member is erected the curtain will be drawn tight and provide an additional barrier which will block the seat occupant from being urged by momentum to pass under the occupant-restraining member.

As it may be desired to have more than one deceleration-sensing means embodied in one seat to release the restraining member of said seat, it might equally be desired to have one deceleration-sensing means on a multiseat vehicle, such sensing means releasing at the same time each restraining member on each seat of said vehicle through connecting means such as electrical wires, mechanical links or hydraulic fluid lines or other energy-transferring means. It is also apparent that a control, switch or valve means connected to all restraining member release means by an energy transfer means could be operated by the operator of said vehicle and thereby at any time quickly release the restraining members embodied in every seat of said vehicle.

It has been illustrated in FIG. 4 that when the restraining member is in its change position its pivot means or axles can be disengaged from their trunnions by a downward push applied by the occupant on the side arms of the restraining member. Such disengagement facilitates egress from the vehicle by said occupants.

OPERATION

When a vehicle incorporating the present invention is subjected to a sudden deceleration of sufficient magnitude block 75 will pull arm 68 by means of cable 96, deform the detent 74, release detent restrained tip 72 and permit arm 68 to rotate about pivot 70 to move fork 62 out of the path of trip rod 56. This allows the contraction of tension spring 60 to move the rod 56 axially out of the holes in holddown straps 54 and clips 58 to release restraining member 14. Simultaneously said member 14 is urged forwardly by spring 116 and rotated upwardly by spring 92 acting upon operating arm 86 as illustrated in FIG. 4. As a consequence the crosspiece 13 of member 14 lifts the undersides of the vehicle ccupant's knees and said vehicle occupant is moved into the folded position illustrated in FIG. 1 with the crosspiece 13 interposed between himself and his forward line of travel. At the same time the occupant's head 22, though it may swing forward to the change position in FIG. 1, is kept from contact with any part of the vehicle interior structure. It will be of note that the end arms 90 provide lateral restraint against side movement of an occupant and the intermediate arms 91 provide lateral restraint in the case of a side impact to block one occupant from being urged by inertia to impact a second occupant seated beside him.

It will be apparent that with the foregoing action the vehicle occupant is cushioned between yielding surfaces and is kept from being thrown forwardly to impact the vehicle interior structure and is prevented from lateral movement. He is compressed between resilient members and is guarded on each side of resilient material covered arms.

As noted above as an alternate to the use of the inertia sensitive actuating means the vehicle operator can operate a manual control means to simultaneously unblock the trip rods 56 for every seat in said vehicle and achieve the same occupant-restraining member operation for every seat.

It will further be apparent that a vehicle may embody both the inertia sensing restraining member release and the operator manually actuated restraining member release so that should the operator fail to perceive an impending impact and thus fail to manually release the restraining members, the inertia sensing restraining member release would operate at the time of impact to release said members.

Because of the danger of fire or other hazard it is frequently vital that vehicle occupants be able to free themselves from all restraints and achieve rapid egress. The quick disengagement slots illustrated in FIG. 4, make it possible for an occupant to free himself quickly from restraint by the natural reflex action of pushing downwardly on his adjacent restraining member arms whose axles are thereby freed from the trunnions. This action would immediately detach the restraining member from the seat structure, facilitating egress.

It will be apparent that by use of well-known means, the unlatching of the restraining member release could simultaneously unlatch a latched universal joint in the steering control structure so that stored energy or vehicle supplied energy could simultaneously cause the steering control means to move out of the path of the restraining member or the legs of the occupant.

I claim:

1. A vehicle occupant restraining device for minimizing injury resulting from sudden vehicle deceleration comprising:
    a vehicle seat having an upright back portion and a substantially horizontal seat portion,
    said seat portion having a section separable therefrom, said separable section adapted to form a restraining member for the vehicle occupant,
    said section being mounted for controlled movement from an occupant-unrestraining position to an occupant-restraining position,
    a curtain, the upper edge of which is secured to said separable section and the lower edge of which is secured to said seat portion structure so that when the separable section is raised to its restraining position, said curtain will be drawn tightly to prevent the occupant from sliding forwardly,
    an energy device linked to said section and serving when activated to move said section into an occupant restraining position, and
    means for controlling the application of energy from said energy device to said section.

2. A vehicle occupant restraining device for minimizing injury resulting from vehicle deceleration exceeding a predetermined level comprising:
    a vehicle seat structure having an upright back and a substantially horizontal seat,
    said seat having a portion movable with respect to the remainder of said seat,
    said portion being mounted for movement from an occupant-nonrestraining position to an occupant-restraining position in which the occupant is restrained from forward movement,
    an energy device linked to said portion and serving when activated to move said portion into an occupant-restraining position,
    latch means for latching said energy device against activation,
    deceleration-sensing means for releasing said latch means when the vehicle deceleration exceeds a predetermined level, said predetermined level being set above the deceleration levels encountered during normal vehicle operation,
    said seat having a portion separable therefrom, said separable portion adapted to restrain forward motion of the vehicle occupant and also having resilient-material-covered side arms to restrain said occupant from lateral motion.

3. The device of claim 2 further comprising construction of said arms to be readily disengaged from said seat structure when in the occupant-restraining position by said occupant.

4. The device of claim 2 which includes a curtainlike construction with the upper edge thereof secured to said separable portion an the lower edge thereof secured to the seat structure so that when the said separable portion is raised to is occupant-restraining position, said curtainlike structure will be deployed therebelow, blocking the passage of said occupant's body below said raised separable portion.

5. The device of claim 4 further comprising said separable portion also having resilient-material-covered side arms.

6. The device of claim 5 further comprising the construction of said arms to be readily disengaged from said seat structure when in the occupant-restraining position by said occupant.

7. A vehicle occupant restraining device for minimizing injury resulting from vehicle deceleration exceeding a predetermined level comprising:
    a vehicle seat structure having an upright back and a substantially horizontal seat,
    said seat having a portion movable with respect to the remainder of said seat,
    said portion being mounted for movement from an occupant-nonrestraining position to an occupant-restraining position in which the occupant is restrained from forward movement,
    an energy device linked to said portion and serving when activated to move said portion into an occupant-restraining position,
    latch means for latching said energy device against activation,
    deceleration-sensing means for releasing said latch means when the vehicle deceleration exceeds a predetermined level, said predetermined level being set above the deceleration levels encountered during normal vehicle operation,
    said portion comprising a framework positioned normally in the upper region of said horizontal seat and movable from a lower nonrestraining position to an upper restraining position.

8. The device of claim 7 wherein said portion is pivoted to the said seat remainder adjacent to the rear of said portion.

9. The device of claim 7 wherein said portion has the upper edge of a curtainlike structure secured thereto, the lower edge of said curtainlike structure being secured to the said seat structure.